US012562291B2

(12) United States Patent
Sylvester et al.

(10) Patent No.: US 12,562,291 B2
(45) Date of Patent: Feb. 24, 2026

(54) METHODS FOR RECYCLING METALS FROM THE NUCLEAR INDUSTRY

(71) Applicant: EnergySolutions, LLC, Salt Lake City, UT (US)

(72) Inventors: Paul Sylvester, Denver, CO (US); Timothy Nicholas Milner, Lexington, SC (US); Colin Russell Austin, Port Charlotte, FL (US)

(*) Notice: Subject to any disclaimer, the term of this patent is extended or adjusted under 35 U.S.C. 154(b) by 0 days.

(21) Appl. No.: 19/203,130

(22) Filed: May 8, 2025

(65) Prior Publication Data

US 2025/0266180 A1 Aug. 21, 2025

Related U.S. Application Data

(63) Continuation-in-part of application No. PCT/US2024/042807, filed on Aug. 16, 2024.

(60) Provisional application No. 63/519,951, filed on Aug. 16, 2023.

(51) Int. Cl.

| | |
|---|---|
| ***G21F 9/12*** | (2006.01) |
| ***C22B 3/00*** | (2006.01) |
| ***G21F 9/00*** | (2006.01) |
| ***G21F 9/30*** | (2006.01) |

(52) U.S. Cl.

CPC ............ *G21F 9/12* (2013.01); *C22B 23/0415* (2013.01); *G21F 9/004* (2013.01); *G21F 9/30* (2013.01)

(58) Field of Classification Search

None

See application file for complete search history.

(56) References Cited

U.S. PATENT DOCUMENTS

| | | | | |
|---|---|---|---|---|
| 6,504,077 B1 | 1/2003 | Purohit et al. | | |
| 2003/0172959 A1* | 9/2003 | Martin | ...................... G21F 9/28 | 134/10 |

(Continued)

FOREIGN PATENT DOCUMENTS

| | | | |
|---|---|---|---|
| EP | 3065139 B1 * | 1/2021 | .............. G21F 9/06 |
| WO | WO 2010/036926 | 4/2010 | |
| WO | WO 2018/020228 | 2/2018 | |

OTHER PUBLICATIONS

International Search Report and Written Opinion from Int'l Pat. App. PCT PCT/US2024/042807, Dec. 26, 2024 (8 pp.).

*Primary Examiner* — Anthony J Zimmer
*Assistant Examiner* — Zachary John Baum
(74) *Attorney, Agent, or Firm* — FisherBroyles, LLP

(57) ABSTRACT

Methods for processing metal components from the nuclear industry are described. In some embodiments, a method includes processing a component having a surface contaminated with radionuclides by dissolving at least a portion of the surface with an acid solution to produce a waste solution including the radionuclides, and separating the radionuclides from the waste solution. In some embodiments, a method includes processing a component including a target radionuclide by immersing at least a portion of the component in an electrolyte bath, applying an electric current to cause electrodissolution, and electroplating the target radionuclide from the solution onto a cathode. In some embodiments, a method includes processing a metal composite component by dissolving it to produce a solution including dissolved metal and particulate material, and separating the particulate material.

17 Claims, 3 Drawing Sheets

(56) References Cited

U.S. PATENT DOCUMENTS

| | | | |
|---|---|---|---|
| 2010/0072059 | A1 | 3/2010 | Peters et al. |
| 2019/0156962 | A1 | 5/2019 | Collins et al. |

* cited by examiner

METHODS FOR RECYCLING METALS FROM THE NUCLEAR INDUSTRY

TECHNICAL FIELD

This relates to methods for recycling metals from the nuclear industry. Nuclear metals recycling can positively impact energy transition and combat climate change.

BACKGROUND

The nuclear industry uses large quantities of metals in the construction and operation of nuclear power plants and supporting infrastructure. These metals, which can include steel, nickel, aluminum, and others, are subject to various forms of radioactive contamination during their service life. This contamination can be in the form of surface contamination, where radionuclides adhere to or are incorporated into the surface oxide layer of the metal, or activation, where the metal itself becomes radioactive due to exposure to neutron flux.

Historically, when these contaminated metals reach the end of their useful life, they have been disposed of as radioactive waste. This typically involves size reduction of the metal components, packaging, and burial at a licensed radioactive waste disposal site. However, this approach has several drawbacks. It permanently consumes valuable disposal site space, it represents a loss of potentially useful material resources, and it contributes to the overall environmental impact of the nuclear industry.

In some cases, surface decontamination techniques have been employed in an attempt to clean the metal surfaces and allow the metal to be released for unrestricted reuse or recycling. However, these techniques often generate significant volumes of secondary radioactive waste. The cost of managing this secondary waste often outweighs the benefits of recovering the decontaminated metal, making direct disposal the more economically favorable option.

The production of metals, particularly steel, is a significant contributor to greenhouse gas emissions. The steel industry alone is responsible for approximately 8% of global greenhouse gas emissions. The production of other metals used in the nuclear industry, such as nickel and aluminum, also carries a substantial carbon footprint. Developing domestic recycling capabilities for these metals will help mitigate the environmental impact of the nuclear industry and contribute to a more sustainable future.

Furthermore, many of the metals used in the nuclear industry, such as nickel and cobalt, have strategic importance and are subject to potential supply disruptions. Developing the ability to recycle these metals domestically could enhance the resilience of the nuclear industry and reduce dependence on foreign suppliers.

Finally, the growth of technologies such as electric vehicles and grid-scale energy storage is driving increased demand for metals such as nickel and lead. Recycling these metals from the nuclear industry could help meet this growing demand without the need for expanded mining operations and their associated environmental impacts.

Although some limited efforts have been made to recycle metals from the nuclear industry, the historical approach has been disposal as radioactive waste or, in some cases, limited surface decontamination. These approaches are not sustainable in the long term, as they consume limited waste disposal resources, result in the loss of potentially valuable materials, and generate significant secondary waste streams. It would be beneficial to develop more effective, holistic approaches to recycling metals from the nuclear industry that can support environmental sustainability, strategic resource independence, and the responsible growth of clean energy technologies.

GENERAL DESCRIPTION

This describes methods of processing metal components from the nuclear industry. The methods facilitate the recycling of metals, including those with surface radionuclide contamination and/or those having bulk-activated regions. The methods can include chemical dissolution using various acid solutions and/or electrochemical processes, such as electrodissolution and electroplating. The methods allow for the separation and recovery of valuable materials, such as the base metals themselves, particulate materials from composites, and/or specific radionuclides such as Cobalt-60 and/or Nickel-63, which can have beneficial uses. By processing these components, the volume of radioactive waste can be reduced, resources can be conserved, and materials can be recovered for reuse or recycling, contributing to environmental sustainability and resource independence.

The methods can include treating surface-contaminated components, such as parts of a steam generator or metal tubing. The surface can include an outer metal oxide coating that includes some, most, or all of the radionuclides. The surface can be dissolved using one or more acid solutions, which can include organic acids and/or mineral acids. Radionuclides dissolved in the resulting waste solution can then be separated using techniques such as ion exchange, solvent extraction, selective precipitation, and/or carbon filtration.

The methods can include processing components with activated regions, such as parts from a reactor vessel. A portion of the component can be immersed in an electrolyte bath and subjected to electrodissolution via an electric current. Target radionuclides dissolved in the electrolyte can be selectively recovered by electroplating them onto a cathode.

The methods can include processing metal composite components, such as dissolving a metal matrix with an acid leaving a particulate material, such as boron carbide, which can then be separated and potentially reused, for instance, as a media blasting agent for decontaminating other nuclear industry components.

The methods can include processing a metal component from the nuclear industry. The metal component can have a surface contaminated with radionuclides. The method can include dissolving at least a portion of the surface of the metal component. Dissolving can be done with an acid solution. Dissolving can produce a waste solution. The waste solution can include the radionuclides. The method can include separating the radionuclides from the waste solution.

The metal component can include metal tubing. The metal tubing can be from the primary side of a steam generator. Dissolving the surface of the metal component can include circulating the acid solution through an interior of the metal tubing. Dissolving the surface of the metal component can be done with a series of at least two different acid solutions.

The acid solution can include a mineral acid. Examples of mineral acids include hydrochloric acid (HCl), nitric acid ($HNO_3$), and/or tetrafluoroboric acid ($HBF_4$). The acid solution can include an organic acid. Examples of organic acids include formic acid and/or oxalic acid. The method can include adding an oxidizing agent to the acid solution. An example of an oxidizing agent includes permanganic acid ($HMnO_4$) or a permanganate salt.

The radionuclides can be separated from the waste solution by passing the waste solution through ion exchange media. The radionuclides can be separated from the waste solution in a solvent extraction process. The radionuclides can be separated from the waste solution with a selective precipitation process. The radionuclides can be separated from the waste solution by passing the waste solution through a carbon bed.

The methods can include treating the surface of the metal component with acids at different temperatures. For example, the surface can be treated with an acid solution at room temperature followed by an acid solution at an elevated temperature. The solution can be heated to a temperature from 90° F.-250° F. The metal component can be part of a steam generator.

The methods can also include decontamination of high nickel alloy tubes (e.g, the various alloys sold under the brand names of Hastelloy, Inconel, Monel, and the like). A mineral acid, such as $HBF_4$, can be circulated through the tubing. The acid can begin circulating at room temperature and increase in temperature up to 176° F. (80° C.). Dissolved radionuclides can be removed from the waste solution using ion-selective media. An oxidizing agent, such as permanganic acid or a permanganate salt, can be added to the mineral acid solution. These steps can be repeated until the solution shows no increase in radioactivity.

The methods can also include decontaminating the secondary side of a steam generator. This can include circulating an acid solution through the metal tubing that forms at least part of the secondary side of the steam generator. The acid solution can include an organic acid. The organic acid can be oxalic acid. A heated acid solution can be circulated first followed by an ambient temperature acid solution. The concentration of the organic acid can be increased until no additional radionuclide contamination is observed. The contaminated solution can be combined with the spent mineral acid (e.g., $HBF_4$). This combination can regenerate acid and/or precipitate metal oxalates with radionuclides. Precipitates can be calcined for disposal.

The methods can also include size-reducing the metal component. For example, a metal component from a steam generator can be size-reduced. A carbon steel shell can receive a final surface preparation using grit blasting. High nickel content tubes can undergo a final decontamination step in an immersion bath. Decontamination can be augmented by passing an electric current through the component into the bath (electrodissolution). The decontaminated high nickel alloy can be released for recycling. Spent acid solution can be combined with an aluminum-rich acid solution. The combined solution can be decontaminated by coprecipitation of aluminum flocs. A hydroxide (e.g., sodium hydroxide, calcium hydroxide, or the like) can be added to remove residual metals as hydroxides. The resultant solids containing metals and radionuclides can be encapsulated in cement.

The methods can also include immersing at least a portion of the metal component in an electrolyte bath. The metal component can include a target radionuclide. An electric current can be applied to the metal component. Applying the electric current can cause electrodissolution of at least the portion of the metal component in the electrolyte solution. The method can include electroplating the target radionuclide from the solution onto a cathode.

The metal component can be from a reactor vessel. The metal component can be an activated internal component of the reactor vessel. The metal component can include a bulk-activated region. The target radionuclide can be a neutron activation product. The target radionuclide can include Cobalt-60 (Co-60). The target radionuclide can include Nickel-63 (Ni-63).

Electroplating the target radionuclide can include selectively electroplating the target radionuclide relative to other dissolved metals from the metal component. The method can include recovering the target radionuclide from the cathode. The recovered target radionuclide (e.g., Co-60 and/or Ni-63) can be reused. The method can include precipitating remaining dissolved metals and/or residual radionuclides from the solution after electroplating the target radionuclide.

The methods can also include dissolving a metal composite component. Dissolving the metal composite component can produce a solution. The solution can include dissolved metal from the metal composite component. The solution can include particulate material from the metal composite component. The method can include separating the particulate material from the solution. The method can include media blasting a surface of another component from the nuclear industry. Media blasting can use the particulate material separated from the solution.

The metal composite component can be dissolved with an acid. The acid can be a mineral acid, such as HCl and/or $HNO_3$. The particulate material can include boron carbide. The metal composite component can be boron carbide impregnated aluminum. The boron carbide particles can be separated from a dissolved aluminum solution. The separated boron carbide can be used as grit for media blasting. Media blasting can remove an activated layer from a surface, such as the inner surface of a spent fuel transport cask. Material removed by grit blasting can be collected. A decontaminated component can be released for reuse, repurposing, and/or further recycling.

In some embodiments, a method of processing a metal component from the nuclear industry having a surface contaminated with radionuclides includes dissolving at least a portion of the surface of the metal component with an acid solution to produce a waste solution including the radionuclides, and separating the radionuclides from the waste solution.

In some embodiments, a method of processing a metal component from the nuclear industry includes immersing at least a portion of the metal component in an electrolyte bath, where the portion of the metal component includes a target radionuclide. The method further includes applying an electric current to the metal component to cause electrodissolution of at least the portion of the metal component in a solution, and electroplating the target radionuclide from the solution onto a cathode.

In some embodiments, a method of processing components from the nuclear industry includes dissolving a metal composite component to produce a solution including dissolved metal from the metal composite component and particulate material from the metal composite component, and separating the particulate material from the solution.

In some embodiments, the methods involve the selective removal of contaminated metal from the surface of a component, such as by mechanical abrasion, chemical dissolution, or electrochemical techniques. This allows the bulk of the metal to be recovered for reuse while concentrating the contamination in a smaller volume of material for more efficient management.

In some embodiments, the methods involve the bulk dissolution of an entire metal component. This can be useful for components with activation or contamination that penetrates beyond the surface. The resulting solution is then treated to separate the valuable metals from the contaminants.

In some embodiments, the methods use waste streams from one processing step as input for another. For example, a chemical decontamination solution used to treat one component might then be used as a dissolution medium for another. As another example, solid particles recovered from one metal component can be used as blasting media to remove contaminated metal from another component. The reuse of various components in the process reduces the overall generation of secondary waste and improves the efficiency of the process.

In some embodiments, the methods also provide for the selective recovery of useful radionuclides from the waste streams. Techniques such as ion exchange, solvent extraction, precipitation (e.g., selective precipitation), and electrochemical methods can be used to concentrate and isolate specific radionuclides that have value for medical, industrial, or research applications.

In some embodiments, the methods also allow the beneficial reuse of recovered materials in the nuclear industry. For example, contaminated metals from one component might be used to manufacture containers or shielding for the storage and disposal of other radioactive wastes.

In some embodiments, a method of recovering metals from nuclear industry components includes removing at least a portion of a first metal component contaminated with radionuclides from the nuclear industry to produce a first waste material. The method also includes removing at least a portion of a second metal component contaminated with radionuclides from the nuclear industry with the first waste material. The first metal component and the second metal component are different types of components.

In some embodiments, a method of recovering metals from nuclear industry components includes removing metal contaminated with radionuclides from a metal component from the nuclear industry to produce a contaminated process stream including the radionuclides. The method also includes separating at least one target radionuclide from the contaminated process stream, and reusing the at least one target radionuclide in a beneficial manner.

In some embodiments, a method of recovering metals from nuclear industry components includes removing metal contaminated with radionuclides from an interior surface of metal tubing from the nuclear industry. This removal is performed by circulating a sequence of at least two different decontamination solutions through the metal tubing to form at least one spent decontamination solution. The method also includes separating radionuclides from the at least one spent decontamination solution.

The net effect of these various aspects is a comprehensive, integrated approach to metal recycling in the nuclear industry. By selectively removing contamination, recycling secondary waste streams, recovering useful byproducts, and enabling beneficial reuse of materials, the methods provide a pathway to more sustainable and environmentally responsible practices.

It should be appreciated that the methods are not limited to any specific metal or component type. They can be adapted to the wide variety of metals and contamination scenarios encountered in the nuclear industry, from lightly surface-contaminated stainless steel to deeply activated reactor components.

The general description is provided to give a general introduction to the described subject matter as well as a synopsis of some of the technological improvements and/or advantages it provides. The general description and background are not intended to identify essential aspects of the described subject matter, nor should they be used to constrict or limit the scope of the claims. For example, the scope of the claims should not be limited based on whether the recited subject matter includes any or all aspects noted in the general description and/or addresses any of the issues noted in the background.

DESCRIPTION OF DRAWINGS

The preferred and other embodiments are described in association with the accompanying drawings in which.

DETAILED DESCRIPTION OF EMBODIMENTS

Figure 1:
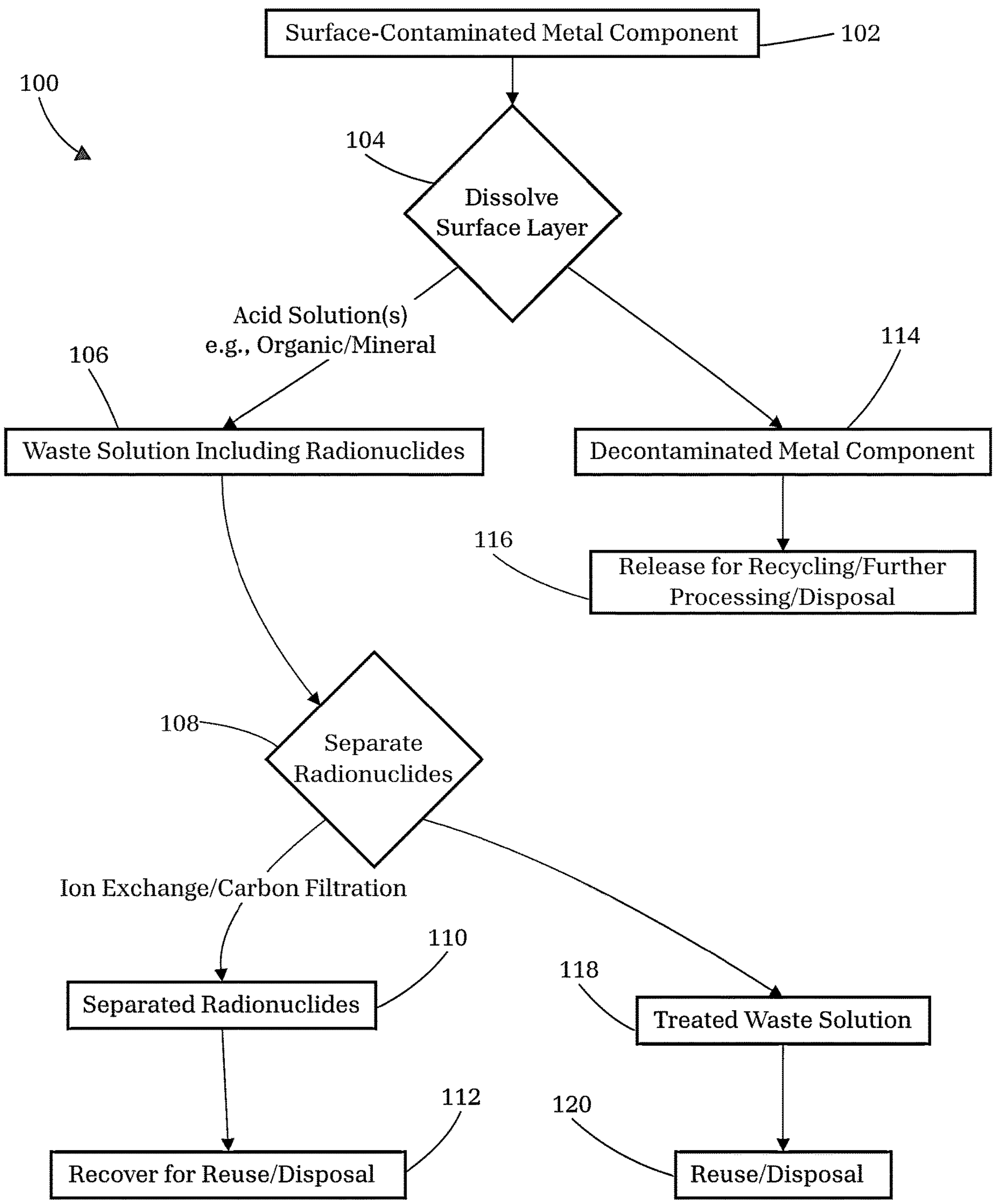
FIG. 1 is a flowchart of one embodiment of a method for processing a metal component having a surface contaminated with radionuclides.

Methods for processing and recycling metals originating from the nuclear industry are described. These methods can be applied to various metal components, including those with surface contamination by radionuclides and/or those comprising bulk-activated regions resulting from neutron exposure. The processing can facilitate the recovery of base metals, such as steel, nickel, and/or aluminum, as well as specific target radionuclides such as Cobalt-60 (Co-60) and/or Nickel-63 (Ni-63) that can have subsequent beneficial uses. The methods aim to reduce the volume of radioactive waste generated, conserve material resources, and enable the reuse and/or recycling of recovered materials, which can support environmental sustainability and strategic resource management.

Processing can involve the selective removal of contaminated metal from the surface of a component. This can be achieved through mechanical techniques, such as media blasting using agents such as carbon dioxide pellets, boron carbide grit, liquid nitrogen, and/or water. Alternatively or additionally, chemical decontamination can be employed using reagents such as acids (e.g., hydrochloric acid (HCl), nitric acid ($HNO_3$), sulfuric acid ($H_2SO_4$), phosphoric acid ($H_3PO_4$), tetrafluoroboric acid ($HBF_4$), formic acid (HCOOH), oxalic acid ($H_2C_2O_4$)), bases (e.g., sodium hydroxide (NaOH), calcium hydroxide ($Ca(OH)_2$)), and/or oxidizing agents (e.g., hydrogen peroxide ($H_2O^2$), potassium permanganate ($KMnO_4$)).

The choice of reagents and operating conditions, such as concentration, temperature, pressure, and/or physical state (gaseous, liquid, solid coatings, gels), can be tailored to the specific metal substrate, the nature of the contamination, and/or the concentration of radionuclides. Often, a sequence of different chemical treatments, potentially combining oxidizing and/or reducing steps, can be applied. For instance, treatment with an organic acid can be followed by treatment with a mineral acid, and/or oxidizing agents can be added to acid solutions. Electrochemical methods can also be used for surface removal. These approaches allow the bulk of the metal component to be potentially recovered while concentrating the radionuclides into a smaller volume waste stream.

In other situations, processing can involve the bulk dissolution of an entire metal component or a significant portion thereof. This approach can be suitable for components where contamination or activation penetrates substantially into the material, beyond just the surface layer. Following dissolution, the resulting solution containing dissolved metals and radionuclides can be treated to separate valuable materials from contaminants.

The methods described allow for the integration of process streams. Waste materials or solutions generated during one step of processing a first metal component can be utilized in a subsequent step, potentially for processing the same component or a different, second metal component. For example, a chemical solution used for decontamination might be reused or repurposed, or solid materials recovered from dissolving one component can be used as processing aids (e.g., blasting media) for another component. This integration can reduce the overall generation of secondary waste and enhance process efficiency.

Furthermore, the methods can incorporate steps for the selective recovery and/or separation of specific radionuclides from contaminated solutions or process streams. Techniques such as ion exchange (using general or ion-selective media), solvent extraction, precipitation (e.g., selective precipitation), coprecipitation, filtration (including micro, nano, and/or ultrafiltration, potentially seeded with ion exchange media), and/or electrochemical deposition (electroplating) can be employed. Recovered radionuclides, such as Co-60 and/or Ni-63, can potentially be further purified and utilized in beneficial applications, including medical treatments, industrial irradiation, nuclear batteries, and/or research.

One application involves processing a metal component from the nuclear industry having a surface contaminated with radionuclides. The surface can include an outer metal oxide coating that includes some, most, or all of the radionuclides. This can involve dissolving at least a portion of the surface of the metal component using an acid solution. This dissolution produces a waste solution that includes the radionuclides originally present on the surface. Subsequently, the radionuclides are separated from the waste solution. The metal component itself can be, for example, metal tubing, such as tubing found within a steam generator, particularly from the primary side which is typically more heavily contaminated due to direct contact with reactor coolant. In such cases, dissolving the contaminated surface portion can involve circulating the acid solution, or a series of different acid solutions, through the interior of the metal tubing.

The acid solutions used can comprise mineral acids, such as HCl, $HNO_3$, $H_2SO_4$, $H_3PO_4$, and/or $HBF_4$. Alternatively or additionally, organic acids such as formic acid (HCOOH) and/or oxalic acid ($H_2C_2O_4$) can be used. In some process sequences, an oxidizing agent, such as hydrogen peroxide ($H_2O_2$), permanganic acid ($HMnO_4$), and/or a permanganate salt (e.g., $KMnO_4$, $NaMnO_4$), can be added to the acid solution, potentially to enhance dissolution or target specific species. The separation of radionuclides from the waste solution can be achieved by solvent extraction, selective precipitation, and/or passing the waste solution through ion exchange media, which can capture dissolved ionic radionuclide species, and/or through a carbon bed, which can adsorb certain contaminants or organic residues.

Selective precipitation leverages the addition of specific chemical reagents to a waste solution, causing target radionuclides to form insoluble compounds, or precipitates, which are then physically removed. For example, to remove nickel radionuclides, dimethylglyoxime (DMG) is introduced, often under controlled pH conditions (neutral to slightly alkaline or weakly acidic), leading to the formation of a highly specific, insoluble nickel(II) dimethylglyoxime complex. Once this nickel-containing solid is separated, for instance by filtration, cesium radionuclides can be subsequently precipitated by adding a reagent like sodium tetraphenylborate. This causes cesium ions to react and form insoluble cesium tetraphenylborate, which is then separated, thus isolating the cesium from the bulk solution.

The chemical treatments can be performed under varying temperature conditions. For instance, the surface of a component can be treated with an acid solution at approximately room temperature, followed by treatment with the same or a different acid solution at an elevated temperature. Elevated temperatures can range, for example, from approximately 90° F. to approximately 250° F. In a specific sequence for decontaminating high nickel alloy tubes, such as those in a steam generator primary side, a mineral acid such as tetrafluoroboric acid can be circulated, initially cold, with the temperature gradually increased up to approximately 176° F. (80° C.). During this circulation, dissolved radionuclides (e.g., Co-60, Ni-63, Cs-137, Sr-90) can be continuously or periodically removed using ion-selective media. An oxidizing agent, such as permanganic acid or a permanganate salt, can be added to the acid solution in a subsequent or repeated step. Such treatment cycles can be continued until monitoring indicates that radionuclide removal from the surfaces is effectively complete (e.g., radioactivity in the circulating solution no longer increases).

Decontamination can also address other parts of components, such as the secondary side of a steam generator. This can involve circulating an acid solution, for example, an organic acid solution such as oxalic acid ($H_2C_2O_4$), through the secondary side tubing. A sequence involving a hot cycle followed by a cold cycle can be used, and the concentration of the acid can be gradually increased until radionuclide removal ceases. The resulting contaminated oxalic acid solution can potentially be combined with spent mineral acid (e.g., $HBF_4$) from primary side decontamination. This combination can facilitate acid regeneration and/or cause the precipitation of metal oxalates, carrying radionuclides with them. These precipitates can then be treated, for example by calcination (heating in air), to produce a stable waste form, such as metal oxides containing the radionuclides, suitable for disposal in a minimized volume.

Following decontamination, the metal component can be size-reduced (e.g., cut into smaller pieces) to facilitate handling and further processing. Different parts can receive final treatments; for example, a carbon steel shell might undergo a final surface preparation such as grit blasting before release for recycling. High nickel content tubes might receive a final decontamination step involving immersion in an acid bath (e.g., tetrafluoroboric acid). This immersion can be enhanced by applying an electric current through the tubes into the bath, causing electrodissolution or electropolishing of the outermost surface layer to remove any residual contamination. The cleaned high nickel alloy can then be released for recycling. Spent acid solutions from such final steps can be further treated. For instance, a spent tetrafluoroboric acid solution can be combined with an aluminum-rich acid solution (potentially generated from dissolving an aluminum-based component, as described later). This combined solution can be treated to induce coprecipitation, for example, by forming aluminum flocs (e.g., aluminum fluoride and/or hydroxide) that scavenge dissolved metals and radionuclides. A final treatment step, such as adding calcium hydroxide, can precipitate remaining metals as hydroxides. The resulting solid precipitates containing the metals and radionuclides can be encapsulated in a suitable matrix, such as cement, for disposal as low-level radioactive waste.

Another application involves processing metal components with bulk-activated regions, such as parts from a reactor vessel or internal structures exposed to significant neutron flux. For these components, contamination exists within the volume of the metal itself, not just on the surface. A method for processing such components involves immersing at least a portion of the metal component, specifically the portion including a target radionuclide (typically a neutron activation product), into an electrolyte bath. An electric current is then applied to the metal component, typically configuring it as the anode. This causes electrodissolution of the metal component, particularly the immersed portion, into the electrolyte solution. As the metal dissolves, the target radionuclides within the activated region also enter the solution.

Target radionuclides commonly found in activated reactor components include Co-60 and/or Ni-63. The method can further include selectively electroplating the target radionuclide(s) from the electrolyte solution onto a cathode. This electroplating step can be controlled to preferentially deposit the target radionuclides (e.g., Co-60, Ni-63) relative to the bulk dissolved metal (e.g., iron, chromium from steel). The cathode, now coated with the concentrated target radionuclide(s), can be removed, and the radionuclide(s) can be recovered from the cathode surface. These recovered radionuclides can then be directed toward beneficial reuse applications—e.g., Co-60 for medical/industrial irradiation, Ni-63 for nuclear batteries. The remaining electrolyte solution, now depleted of the target radionuclides but still containing the bulk dissolved metal and potentially other residual radionuclides, undergoes further processing. This can involve steps such as precipitation of the remaining dissolved metals and/or residual radionuclides, followed by filtration and appropriate disposal or recycling of the resulting materials, similar to the treatment of other waste solutions described earlier.

A further application involves processing metal composite components used in the nuclear industry. An example is boron carbide impregnated aluminum, often used as a neutron poison material (e.g., in spent fuel racks). A method for processing such a component involves dissolving the metal composite component, specifically the metal matrix, using a suitable solvent, typically an acid but also possibly a strong base (e.g., sodium hydroxide). For instance, dissolving boron carbide impregnated aluminum can be done using a mineral acid such as HCl and/or $HNO^3$. This dissolution process yields a solution containing the dissolved metal (e.g., aluminum) and leaves the non-metallic component (e.g., boron carbide) as particulate material suspended or settled in the solution. The method then includes separating the particulate material from the solution (e.g., by filtration, decantation, or centrifugation).

The recovered particulate material can optionally be reused in subsequent processes. For example, separated boron carbide particles can be used as a media blasting grit. This recovered grit can be used for media blasting a surface of another component from the nuclear industry, such as the inner surface of a spent fuel transport cask which might have a slightly activated surface layer. The media blasting removes the contaminated or activated surface layer. The material removed during blasting (comprising the surface material and used grit) is collected for appropriate waste management. The decontaminated component (e.g., the transport cask) can then be released for reuse, repurposing, or further recycling (e.g., melting). The solution containing the dissolved metal (e.g., the aluminum-rich acid solution from dissolving the composite) can also be further processed, potentially integrated with other waste streams as described previously (e.g., used for coprecipitation).

The methods described can be adapted and combined to address the diverse range of metals, component types, and contamination scenarios found in the nuclear industry, providing a flexible and integrated approach to metal recycling that aims to minimize waste, maximize resource recovery, and support environmental objectives. Techniques such as metal melting, reforming, 3D printing, pyrolysis of organic compounds, oxidation, and/or selective oxidation can also be incorporated into the overall recycling and repurposing workflow following decontamination and/or material separation.

FIG. 1 is a flowchart of one embodiment of a method 100 for processing a metal component 102 having a surface contaminated with radionuclides. The method 100 begins with the surface-contaminated metal component 102. Step 104 involves dissolving at least a portion of the surface layer of the component 102. This dissolution 104 can be performed using one or more acid solutions, which can be organic and/or mineral acids. The dissolution step 104 produces two streams: a waste solution 106 containing the radionuclides removed from the surface, and the remaining metal component 114, which is now decontaminated or has reduced surface contamination. The decontaminated metal component 114 can then proceed to step 116 for release, potentially for recycling, further processing (e.g., size reduction, melting), and/or disposal. The waste solution 106 proceeds to a separation step 108, where radionuclides are separated from the bulk solution. This separation 108 can be achieved using techniques such as ion exchange, solvent extraction, selective precipitation, and/or carbon filtration. The separation step 108 yields separated radionuclides 110 and a treated waste solution 118. The separated radionuclides 110 can undergo recovery for reuse and/or disposal in step 112. The treated waste solution 118, now depleted of the target radionuclides, can be directed to reuse and/or disposal in step 120.

Figure 2:
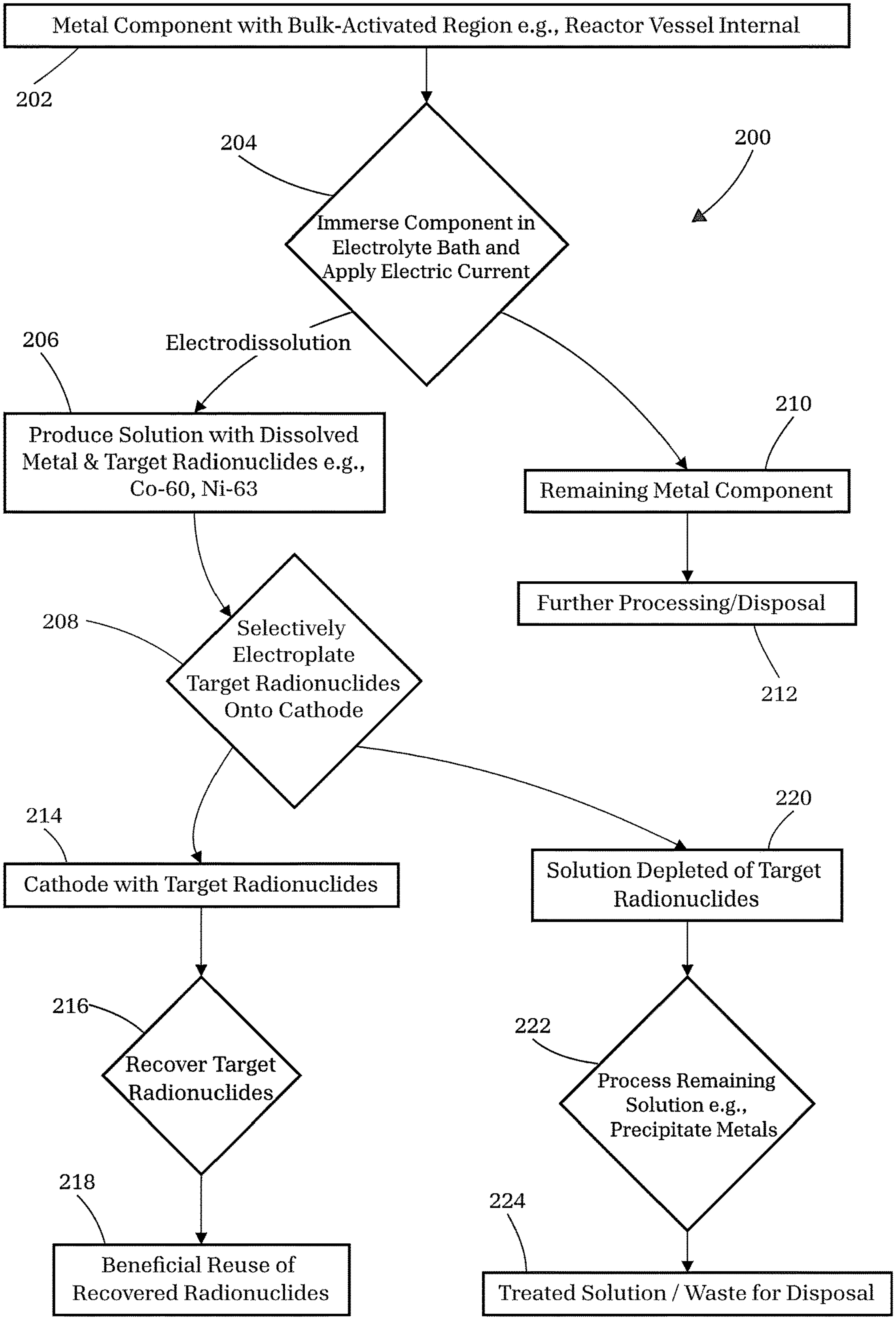
FIG. 2 is a flowchart of one embodiment of a method for processing a metal component having a bulk-activated region.

FIG. 2 is a flowchart of one embodiment of a method 200 for processing a metal component 202 having a bulk-activated region, such as an internal component from a reactor vessel. The method 200 starts with the metal component 202. In step 204, at least a portion of the component 202 (specifically the activated region) is immersed in an electrolyte bath, and an electric current is applied. This step 204 utilizes electrodissolution, causing the immersed portion of the metal component 202 to dissolve. This produces a solution 206 containing dissolved metal from the component 202 as well as target radionuclides (e.g., Co-60, Ni-63) that were present in the activated region. The process also leaves the remaining (undissolved) part of the metal component 210, which can proceed to further processing and/or disposal in step 212. The solution 206 containing dissolved metal and target radionuclides proceeds to step 208, where the target radionuclides are selectively electroplated onto a cathode. This step 208 yields two streams: a cathode 214 bearing the deposited target radionuclides, and a solution 220 that is now depleted of the target radionuclides but still contains the bulk dissolved metal. The cathode 214 proceeds to step 216 where the target radionuclides are recovered. These recovered radionuclides can then be directed to beneficial reuse in step 218. The solution 220 depleted of target radionuclides proceeds to step 222 for further processing, such as precipitating the remaining dissolved metals and/or any residual radionuclides. This results in a treated solution and/or waste stream 224 suitable for disposal.

Figure 3:
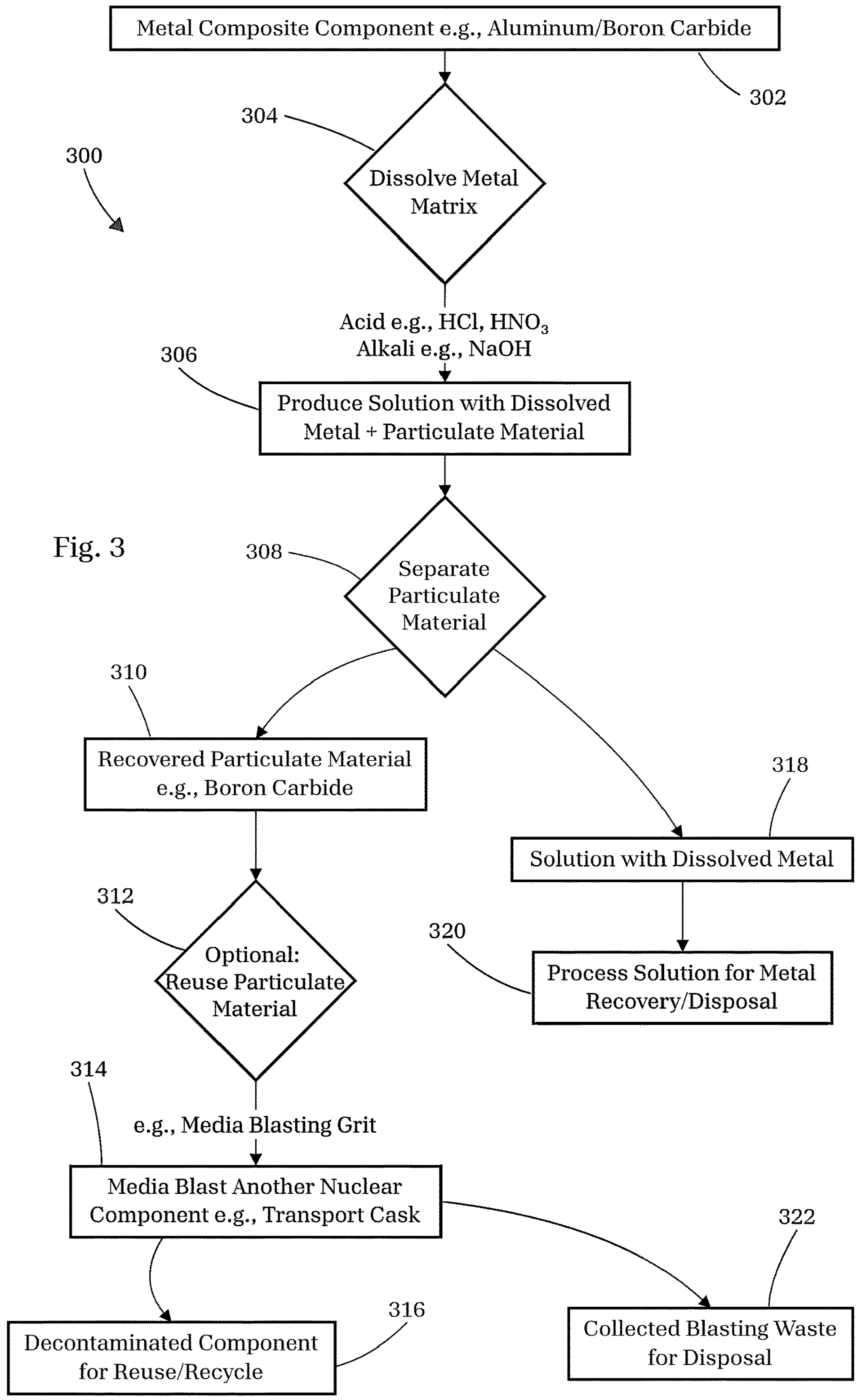
FIG. 3 illustrates a flowchart of one embodiment of a method for processing a metal composite component and optionally reusing recovered particulate material.

FIG. 3 presents a flowchart of one embodiment of a method 300 for processing a metal composite component 302, such as aluminum impregnated with boron carbide. The method 300 begins with the metal composite component 302. In step 304, the metal matrix of the composite is dissolved. This can be achieved using an acid (e.g., HCl, $HNO_3$) or potentially a strong base (e.g., NaOH). The dissolution step 304 produces a mixture or slurry 306 containing the solution with the dissolved metal and the undissolved particulate material from the composite. This mixture 306 proceeds to step 308, where the particulate material is separated from the solution (e.g., filtration, centrifugation, sedimentation, and the like). Step 308 yields recovered particulate material 310 (e.g., boron carbide) and a solution 318 containing the dissolved metal. The solution 318 can be directed to further processing for metal recovery and/or disposal in step 320. The recovered particulate material 310 can optionally proceed to step 312 for reuse. If reuse is chosen (step 312), the particulate material 310 can be used, for example, as media blasting grit in step 314. In step 314, the recovered particulate material is used to media blast another nuclear component, such as a transport cask, to remove surface contamination or activation. This blasting step 314 produces a decontaminated component 316, which can be sent for reuse and/or recycling, and also generates collected blasting waste 322 (containing used grit and removed surface material) which is sent for disposal.

Additional High-Level Description

Decontamination of metallic substrates in the nuclear industry can be achieved using mechanical and/or chemical techniques. Mechanical methods include media blasting using agents such as $CO_2$ pellets, boron carbide grit, liquid nitrogen, and water.

Chemical decontamination can include the sequential application of reagents ranging from mildly to highly corrosive reagents, including acids (e.g., HCl, $HNO_3$, $H_2SO_4$, $H_3PO_4$, $HBF_4$, HCOOH, $H_2C_2O_4$), bases (e.g., NaOH, $Ca(OH)_2$), and oxidizing agents (e.g., $H_2O_2$, $KMnO_4$). The choice of reagents and conditions (e.g., concentration, temperature, pressure, physical state) is tailored to the specific substrate and the nature and concentration of the radionuclide contamination. The goal is to effect minimal dissolution of the base metal while maximizing radionuclide removal and transport.

Reagents can be applied in gaseous, liquid, or solid form (e.g., coatings, gels). Multiple techniques are often applied in sequence to enhance decontamination efficiency while preserving substrate integrity and simplifying subsequent waste treatment to minimize secondary waste. When aqueous reagents are reused, the waste treatment step can include sequestering the removed radionuclides on highly selective ion exchange resins for subsequent harvesting and reuse in radio-medical, industrial, and other applications.

After radionuclide removal, the spent liquids can undergo coprecipitation to remove dissolved metals and any residual radionuclides. This can involve a broad spectrum of feed materials to ensure the presence of sufficient aluminum, iron, and copper in the resultant solutions, allowing for bulk co-precipitation of easily dewaterable flocs. In some cases, ion exchangers can be added to sequester radionuclides in a single co-precipitation step. The co-precipitated solids, now largely free of radionuclides, can be encapsulated in a minimal volume of solid matrix and disposed of as low-level radioactive waste. The aqueous fraction, now cleansed of radionuclides and dissolved metals, can be recycled back to the initial decontamination step to minimize radioactive liquid effluents and/or can be discharged to the environment provided activity levels are low enough.

The recycled metals can be repurposed through various processes such as melting, reforming, and 3D printing to create new products. This approach significantly reduces the need for virgin metal derived from ore in future nuclear construction projects.

The described methods integrate advanced metallurgical and chemical techniques into a single, comprehensive process for the economical and beneficial recycling of metals used in the nuclear industry. This presents a unique opportunity to reduce greenhouse gas emissions and contribute to a secure, clean energy future. Some of the techniques employed include, but are not limited to:

- Chemical and selective dissolution of individual components in alloys
- Electrochemical dissolution
- Highly selective ion exchange
- Solvent extraction processes
- Flocculation and coprecipitation
- Micro, nano, and ultrafiltration (seeded with ion exchange media)
- Pyrolysis of organic compounds
- Metal melting
- 3D printing of metal products
- Oxidation and selective oxidation

EXAMPLES

The following examples are provided to further illustrate the disclosed subject matter. They should not be used to constrict or limit the scope of the claims in any way.

Example 1—Metal Composites

This example describes processing metal composites such as boron carbide impregnated aluminum. This material is often used as a neutron poison in spent fuel storage. For example, it may be used in or with fuel racks in both spent fuel pools and dry cask storage.

The process includes dissolving the metal composite in a mineral acid bath such as hydrochloric acid (HCl) or nitric acid ($HNO_3$). This is done by placing the spent fuel rack in a corrosion-resistant tank with the mineral acid. The acid dissolves the aluminum while leaving solid boron carbide particles. Once the aluminum has fully dissolved, the boron carbide particles are separated from the dissolved aluminum solution.

Example 2—Media Blasting with Boron Carbide Grit

This example describes using the boron carbide grit recovered in Example 1 for media blasting the inner surface of a spent fuel transport cask. The inner surface of the cask is slightly activated due to neutron exposure during its service life with the activation typically limited to a few millimeters of depth from the inner surface.

The boron carbide grit is loaded into a media blasting apparatus. The inner surface of the spent fuel transport cask is subjected to grit blasting using the recycled boron carbide. This process effectively removes the activated layer from the inner surface of the cask.

The material removed by the grit blasting process, which includes the activated metal particles and used boron carbide grit, is collected using appropriate containment and filtration systems.

Following the grit blasting operation, the inner surface of the transport cask is evaluated for residual radioactivity. If necessary, the blasting process is repeated to ensure thorough decontamination.

The decontaminated transport cask can now be released for reuse, repurposing, or further recycling processes such as metal melting. The collected waste material from the blasting process is properly packaged for disposal as low-level radioactive waste.

This example demonstrates how the product of one decontamination process can be used in another decontamination process. The boron carbide, initially a component of one nuclear industry component (spent fuel racks), is recovered and repurposed for the decontamination of another nuclear industry component (transport casks). This approach minimizes waste, reduces the need for new materials, and exemplifies the holistic recycling process described in this document.

Example 3—Decontamination of a Steam Generator from a Pressurized Water Reactor (PWR)

This example describes the decontamination process for a 150-ton steam generator from a pressurized water reactor (PWR). The process is used to recycle approximately 140 tons of metal, including about 14 tons of nickel, while minimizing radioactive waste metal to only about 10 tons (7% of the initial mass).

The decontamination process for the primary side of the steam generator is as follows. The primary side of the steam generator is in direct contact with the reactor and thus more heavily contaminated. The process involves recirculating fluids inside the steam generator's primary side tubing in the following sequence.

The first step is to circulate water through the primary side tubing and filter the water with metal filters (e.g., dead-end sintered metal filters), carbon beds, and/or ion exchange media including ion-selective media. This step removes loose contamination and solids and otherwise prepares the tubing for further treatment.

The next step is to treat the tubing with a room temperature organic acid solution. An organic acid, such as formic acid (HCOOH, a reducing acid), is added to water at room temperature and circulated through the primary side tubing. The solution is filtered as in the initial step. The next step is to repeat the organic acid treatment with a heated solution (the organic solution can be heated to any suitable temperature from 90-250° F.).

The next step is to add hydrogen peroxide and destroy any remaining organic acid, thereby yielding carbon dioxide and water and destroying any metal complexes formed during the process. The resulting water is then decontaminated by passing it through the carbon and ion-selective media.

These oxidative and reductive dissolution steps remove the bulk of the dominant radionuclides (Co-60, Sr-90, Ni-63, and Cs-137) from the oxide film, significantly reducing the radiation field of the steam generator. The removed radionuclides are entrained on the ion-selective media for subsequent harvesting and beneficial reuse.

Following these steps, further decontamination is performed to address radionuclide contamination associated with the high nickel alloy tubes. This contamination is removed by circulating a highly corrosive mineral acid, such as tetrafluoroboric acid ($HBF_4$), through the primary side tubing. The process begins with cold recirculation, then gradually increases the temperature up to 176° F. (80° C.). Dissolved radionuclides (Co-60, Ni-63, Cs-137, Sr-90) are sequentially removed using ion-selective media. This step is then repeated with the addition of permanganic acid ($HMnO_4$) or a permanganate salt (e.g, $KMnO_4$, $NaMnO_4$, etc.) as an oxidizing agent to the mineral acid solution. These steps are repeated until the decontaminant solution no longer shows an increase in radioactivity thereby indicating that the primary side contamination has been effectively removed.

The secondary side of the steam generator is decontaminated as follows. An oxalic acid ($H_2C_2O_4$) solution is circulated through the secondary side of the steam generator. The process begins with a hot cycle, followed by a cold cycle. The concentration of oxalic acid is gradually increased until no additional radionuclide contamination is observed in the solution.

The contaminated oxalic acid solution is combined with the spent $HBF_4$ from the primary side decontamination. This combination regenerates the acid and precipitates metal oxalates with associated radionuclides. The precipitates are then calcined for disposal as minimal volume metal oxides and radionuclides.

After the decontamination processes, the steam generator can be safely size-reduced. The carbon steel shell is given a final surface preparation using grit blasting before release. The high nickel content tubes undergo a final decontamination step in an immersion bath of $HBF_4$. The decontamination is augmented by passing an electric current through the component into the bath, effectively dissolving the surface of the component (electrodissolution). The decontaminated, cleaned high nickel alloy can be released for recycling.

The spent acid solution is combined with the aluminum-rich acid solution from Example 1. The resulting solution is decontaminated by coprecipitation of aluminum flocs (fluoride and hydroxide). A final cleansing step is performed by adding calcium hydroxide to remove residual metals as the hydroxides. The resultant precipitated solids containing metals and radionuclides are encapsulated in cement.

The reactor vessel can be decontaminated using the process described below in Example 4.

Example 4—Activated Reactor Vessels and Components

Reactor vessels and other components having activated metals can be decontaminated as follows. Unlike surface-contaminated components, reactor vessels have bulk-activated regions, albeit typically comprising only a small fraction of the total metal mass. The activated region, while only a minimal fraction of the bulk metal, is contaminated throughout its volume rather than just on the surface. To address this, a complete dissolution of the activated region is achieved using an electrodissolution (or electrodeplating) step.

The activated component is immersed in an electrolyte bath. An electric current is then passed through the component, which acts as the anode, causing it to begin dissolving into the solution. This electrodissolution process allows for the selective dissolution of the activated region, minimizing the amount of non-activated metal that enters the solution.

As the activated metal dissolves, elements such as cobalt and nickel, which are typically present in lower fractions, enter the solution. These dissolved radioactive elements, primarily Co-60 and Ni-63, can then be selectively redeposited through electroplating. The electroplating step can be performed either onto designated segments of the activated metal itself or onto new cathodes introduced into the system.

The selective electroplating of Co-60 and Ni-63 serves a dual purpose. First, it separates these radioactive isotopes from the bulk of the dissolved metal, allowing for easier handling and processing of the remaining solution. Second, it concentrates these isotopes for potential beneficial reuse in various applications. For example, the recovered Co-60 can be utilized in radio-medical applications, such as cancer treatments, or in industrial applications such as the irradiation of food for preservation. Ni-63, with its long half-life, can be used in nuclear batteries and other specialized industrial uses.

The remaining solution, now largely depleted of radioactive cobalt and nickel, undergoes further processing similar to that described for the steam generator decontamination. This includes precipitation of remaining metals and radionuclides, filtration, and appropriate disposal or recycling of the resulting materials.

This approach to treating activated reactor vessel components demonstrates the versatility of the described methods. By employing electrodissolution and selective electroplating, it's possible to not only decontaminate these materials but also to recover valuable radioactive isotopes for beneficial use. This process minimizes waste while maximizing the recovery and potential reuse of both stable and radioactive materials.

The combination of techniques used for decontaminating surface-contaminated components (such as steam generators) and bulk-activated components (such as reactor vessel parts) showcases the comprehensive nature of the metal recycling method. It addresses the varied challenges presented by different types of nuclear industry components, offering a holistic approach to nuclear metal recycling that minimizes waste, recovers valuable materials, and contributes to the reduction of greenhouse gas emissions associated with new metal production.

Illustrative Embodiments

The following is a description of various embodiments of the disclosed subject matter. Each embodiment may include one or more of the various features, characteristics, or advantages of the disclosed subject matter. The embodiments are intended to illustrate a few aspects of the disclosed subject matter and should not be considered a comprehensive or exhaustive description of all possible embodiments.

P1. A method of recycling metals from nuclear industry components, the method comprising any combination of one or more of the following: removing metal contaminated with radionuclides from a metal component from the nuclear industry resulting in a contaminated solution including the radionuclides; and separating the radionuclides from the contaminated solution.

P2. The method of P1 wherein the method produces a waste material, the method comprising using the waste material in a subsequent step in the method.

P3. The method of any one of P1 to P2 wherein the metal component is a first metal component, the method comprising reusing at least a portion of the contaminated solution to remove metal contaminated with radionuclides from a second metal component.

P4. The method of any one of P1 to P3 wherein removing the metal contaminated with radionuclides comprises removing a layer of contaminated metal and/or metal oxide from a surface of the metal component.

P5. The method of any one of P1 to P4 wherein removing the metal contaminated with radionuclides comprises dissolving the entire metal component.

P6. The method of any one of P1 to P5 wherein removing the metal contaminated with radionuclides comprises mechanical removal, chemical removal, and/or electrochemical removal.

P7. The method of any one of P1 to P6 wherein removing the metal contaminated with radionuclides comprises blasting it with solid, gaseous, or liquid media.

P8. The method of any one of P1 to P7 wherein removing the metal contaminated with radionuclides comprises applying an acid, base, oxidizing agent, and/or reducing agent to the metal component.

P9. The method of P8 comprising applying HCl, $HNO_3$, $H_2SO_4$, $H_3PO_4$, $HBF_4$, HCOOH, $H_2C_2O_4$, $H_2O_2$, $KMnO_4$, NaOH, and $Ca(OH)_2$ to the metal component to remove the metal contaminated with radionuclides.

P10. The method of any one of P1 to P9 wherein separating the radionuclides from the contaminated solution comprises ion exchange, solvent extraction, precipitation (e.g., selective precipitation), coprecipitation, and/or electrochemical deposition.

P11. A method of recycling metals from nuclear industry components, the method comprising any combination of one or more of the following: removing at least a portion of a first metal component contaminated with radionuclides from the nuclear industry to produce a first waste material; and removing at least a portion of a second metal component contaminated with radionuclides from the nuclear industry with the first waste material, the first metal component and the second metal component being different types of components.

P12. The method of P11 wherein removing at least a portion of the first metal component comprises dissolving at least a portion of the first metal component.

P13. The method of any one of P11 to P12 wherein the first waste material includes solid particles removed from the first metal component.

P14. The method of any one of P11 to P13 wherein the first metal component and/or the second metal component include a spent fuel rack, spent fuel transport cask, steam generator, reactor vessel, and/or activated reactor components.

P15. The method of any one of P11 to P14 wherein the first waste material comprises a chemical solution that dissolves at least a portion of the second metal component.

P16. The method of any one of P11 to P15 comprising separating radionuclides from a solution produced by removing at least a portion of the second metal component.

P17. The method of any one of P11 to P16 wherein the first metal component comprises aluminum and the second metal component comprises steel.

P18. A method of recycling metals from nuclear industry components, the method comprising any combination of one or more of the following: removing metal contaminated with radionuclides from an interior surface of metal tubing from the nuclear industry by circulating a series of at least two decontamination solutions through the metal tubing to form at least one spent decontamination solution; and separating radionuclides from the spent decontamination solution.

P19. The method of P18 wherein at least one of the at least two decontamination solutions dissolves at least a portion of the interior surface of the contaminated metal tubing.

P20. The method of any one of P18 to P19 wherein removing the metal contaminated with radionuclides includes applying an electric current to the metal tubing.

P21. The method of any one of P18 to P20 wherein the series of at least two decontamination solutions comprises a water wash, an organic acid solution, an oxidizing agent solution, reducing agent solution, and/or a mineral acid solution.

P22. The method of any one of P18 to P21 wherein separating radionuclides from the spent decontamination solution comprises passing the spent decontamination solution through carbon beds and/or ion exchange media or a series of solvent extraction and/or selective precipitation units.

P23. The method of any one of P18 to P22 wherein the metal tubing is part of a steam generator or reactor vessel.

P24. The method of any one of P18 to P23 further comprising size-reducing the metal tubing after removing the metal contaminated with radionuclides.

P25. A method of recycling metals from nuclear industry components comprising: removing metal contaminated with radionuclides from a first metal component to produce a waste material; and reusing the waste material to remove metal contaminated with radionuclides from a second metal component, wherein the first metal component and the second metal component are different types of nuclear industry components.

P26. The method of P25 wherein the waste material comprises a chemical solution produced by dissolving at least a portion of the first metal component, and the chemical solution is reused to dissolve contaminated metal from the second metal component.

P27. The method of any one of P25 to P26 wherein the waste material comprises solid particles removed from the first metal component, and the solid particles are reused as blasting media to remove contaminated metal from the second metal component.

P28. The method of P27 wherein the solid particles comprise boron carbide grit.

P29. The method of any one of P25 to P28 wherein the first metal component is selected from a spent fuel rack and the second metal component is selected from a spent fuel transport cask.

P30. The method of any one of P25 to P29 further comprising separating radionuclides from a solution generated during removal of metal from the second metal component using coprecipitation with aluminum flocs.

P31. The method of P30 wherein the aluminum flocs are generated by combining aluminum from a dissolved fuel rack with calcium hydroxide.

P32. The method of any one of P25 to P31 wherein the first metal component is a boron carbide-impregnated aluminum fuel rack, and the second metal component is a carbon steel or stainless steel reactor vessel.

P33. The method of any one of P25 to P32 wherein reusing the waste material reduces secondary radioactive waste volume by at least 40% compared to separate disposal of materials from the first and second components.

P34. A method of recycling metals from nuclear industry components comprising: circulating a sequence of decontamination solutions through metal tubing of a steam generator or reactor vessel, the sequence comprising: (i) an organic acid solution, (ii) an oxidizing agent solution, and (iii) a mineral acid solution; and separating radionuclides from spent decontamination solutions using ion exchange media, selective precipitation or solvent extraction.

P35. The method of P34 wherein the mineral acid solution comprises tetrafluoroboric acid ($HBF_4$).

P36. The method of any one of P34 to P35 further comprising applying an electric current to the metal tubing in an immersion bath.

P37. The method of any one of P34 to P36 wherein the oxidizing agent solution comprises hydrogen peroxide ($H_2O_2$) or potassium permanganate ($KMnO_4$) or sodium permanganate ($NaMnO_4$).

P38. The method of any one of P34 to P37 further comprising size-reducing the metal tubing after separating the radionuclides.

P39. The method of any one of P34 to P38 wherein the sequence of decontamination solutions further includes a water wash cycle prior to the organic acid solution.

P40. A method of recycling metals from an activated nuclear reactor component comprising: immersing the component in an electrolyte bath; electrodissolving an activated region of the component by applying an electric current to the component as an anode; selectively electroplating Co-60 or Ni-63 from the electrolyte bath onto a cathode; and recovering the electroplated Co-60 or Ni-63 for medical or industrial reuse.

P41. The method of P40 wherein the cathode is a portion of the activated nuclear reactor component.

P42. The method of any one of P40 to P41 further comprising combining the electrolyte bath with an aluminum-rich solution from a dissolved aluminum fuel rack to coprecipitate residual radionuclides.

P43. The method of any one of P40 to P42 further comprising recovering the electroplated Co-60 for use in medical sterilization or cancer treatment.

P44. The method of any one of P40 to P43 further comprising melting non-activated portions of the component for reuse in 3D-printed nuclear shielding.

P45. A method comprising: removing metal contaminated with radionuclides from a first metal component from the nuclear industry to produce a waste material; and using the waste material to remove metal contaminated with radionuclides from a second metal component from the nuclear industry, the first metal component and the second metal component being different types of components.

P46. The method of P45 comprising separating radionuclides from a solution produced by removing the metal contaminated with radionuclides from the second metal component.

P47. The method of any one of P45 to P46 comprising reusing at least a portion of the waste material as blasting media to remove the metal contaminated with radionuclides from the second metal component.

P48. The method of any one of P45 to P47 wherein the waste material comprises solid particles removed from the first metal component.

P49. The method of any one of P45 to P48 wherein the first metal component comprises aluminum and the second metal component comprises steel.

P50. The method of any one of P45 to P49 wherein removing the metal contaminated with radionuclides from the first metal component comprises dissolving at least a portion of the first metal component.

P51. The method of any one of P45 to P50 wherein the first metal component and/or the second metal component include a spent fuel rack and/or a spent fuel transport cask.

P52. The method of any one of P45 to P51 wherein at least 90% of the metal from the first metal component and/or the second metal component is recovered for reuse.

P53. The method of any one of P45 to P52 wherein the waste material comprises a chemical solution that dissolves at least a portion of the second metal component.

P54. The method of P53 wherein the chemical solution includes an acid and/or an oxidizing agent.

P55. A method comprising: generating a contaminated solution by removing metal contaminated with radionuclides from a metal component from the nuclear industry; and separating specific radionuclides from the contaminated solution using ion exchange and/or electrochemical deposition for reuse in medical and/or industrial applications.

P56. The method of P55 comprising recovering at least one radionuclide selected from Co-60 and/or Ni-63 from the contaminated solution.

P57. The method of any one of P55 to P56 wherein separating the specific radionuclides comprises electrochemical deposition structured to redeposit the radionuclides onto a cathode.

P58. The method of any one of P55 to P57 wherein the metal component includes a steam generator and/or a reactor vessel.

P59. The method of any one of P55 to P58 comprising achieving at least 90% metal recovery from the metal component.

P60. A method comprising: sequentially applying mechanical removal, chemical dissolution, and/or electrochemical removal to a metal component from the nuclear industry to remove metal and oxide layers contaminated with radionuclides; and processing the metal component to recover at least 90% of the metal for reuse.

P61. The method of P60 comprising circulating a series of at least two decontamination solutions through metal tubing of the metal component.

P62. The method of P61 wherein the series of at least two decontamination solutions comprises an organic acid solution and/or an oxidizing agent solution.

P63. The method of any one of P60 to P62 wherein the metal component is a reactor vessel and electrochemical removal comprises electrodissolution.

P64. The method of any one of P60 to P63 wherein the method reduces greenhouse gas emissions by at least 50% compared to production of virgin metal.

P65. A method of recovering metals from nuclear industry components, the method comprising: removing at least a portion of a first metal component contaminated with radionuclides from the nuclear industry to produce a first waste material; and removing at least a portion of a second metal component contaminated with radionuclides from the nuclear industry with the first waste material, the first metal component and the second metal component being different types of components.

P66. The method of P65 wherein removing at least the portion of the first metal component comprises dissolving at least the portion of the first metal component in a liquid to produce the first waste material as a chemical solution.

P67. The method of P66 wherein removing at least the portion of the second metal component comprises contacting the second metal component with the chemical solution.

P68. The method of any one of P65 to P67 wherein removing at least the portion of the first metal component comprises dissolving a first material of the first metal component while leaving solid particles of a second material of the first metal component, the first waste material including the solid particles.

P69. The method of P68 wherein removing at least the portion of the second metal component comprises blasting the second metal component with the solid particles.

P70. The method of P69 wherein the first metal component comprises boron carbide impregnated aluminum, the first material comprises aluminum, and the solid particles comprise boron carbide grit.

P71. The method of any one of P65 to P70 wherein the first metal component and/or the second metal component include a spent fuel rack, a spent fuel transport cask, a steam generator, a reactor vessel, and/or an activated reactor component.

P72. The method of any one of P65 to P71 comprising separating radionuclides from a process stream produced by removing at least the portion of the second metal component with the first waste material.

P73. A method of recovering metals from nuclear industry components, the method comprising: removing metal contaminated with radionuclides from a metal component from the nuclear industry to produce a contaminated process stream including the radionuclides; separating at least one target radionuclide from the contaminated process stream; and reusing the at least one target radionuclide in a beneficial manner.

P74. The method of P73 wherein the at least one target radionuclide comprises Co-60 and/or Ni-63.

P75. The method of any one of P73 to P74 comprising separating the at least one target radionuclide from the contaminated process stream with ion exchange media.

P76. The method of any one of P73 to P75 comprising separating the at least one target radionuclide from the contaminated process stream by electroplating the at least one target radionuclide onto a cathode.

P77. The method of P76 wherein removing the metal contaminated with the radionuclides comprises electrodissolution of at least a portion of the metal component with the metal component acting as an anode.

P78. The method of any one of P73 to P77 wherein removing the metal contaminated with the radionuclides comprises contacting the metal component with at least one chemical decontamination solution to produce the contaminated process stream.

P79. The method of any one of P73 to P78 wherein reusing the at least one target radionuclide comprises reusing the at least one target radionuclide in a medical application and/or an industrial application.

P80. A method of recovering metals from nuclear industry components, the method comprising: removing metal contaminated with radionuclides from an interior surface of metal tubing from the nuclear industry by circulating a sequence of at least two different decontamination solutions through the metal tubing to form at least one spent decontamination solution; and separating radionuclides from the at least one spent decontamination solution.

P81. The method of P80 wherein at least one of the decontamination solutions dissolves at least a portion of the interior surface of the metal tubing.

P82. The method of any one of P80 to P81 comprising removing metal contaminated with the radionuclides from the metal tubing by applying an electric current between the metal tubing and an electrode positioned relative to the metal tubing.

P83. The method of any one of P80 to P82 wherein the decontamination solutions comprise at least two of a water wash, an organic acid solution, an oxidizing agent solution, a reducing agent solution, and/or a mineral acid solution.

P84. The method of P83 wherein the sequence comprises circulation of the organic acid solution comprising formic acid followed by circulation of the mineral acid solution comprising tetrafluoroboric acid.

P85. A method of processing a metal component from the nuclear industry having a surface contaminated with radionuclides, the method comprising: dissolving at least a portion of the surface of the metal component with an acid solution to produce a waste solution including the radionuclides; and separating the radionuclides from the waste solution.

P86. The method of P85 wherein the metal component comprises metal tubing and dissolving at least the portion of the surface of the metal component comprises circulating the acid solution through an interior of the metal tubing.

P87. The method of P86 wherein the metal tubing is part of a steam generator.

P88. The method of any one of P85 to P87 comprising dissolving at least the portion of the surface of the metal component with a series of at least two different acid solutions.

P89. The method of any one of P85 to P88 wherein the surface comprises a metal oxide coating including the radionuclides.

P90. The method of any one of P85 to P89 wherein the acid solution comprises a mineral acid.

P91. The method of P90 wherein the mineral acid comprises tetrafluoroboric acid.

P92. The method of any one of P85 to P91 wherein the acid solution comprises an organic acid.

P93. The method of P92 wherein the organic acid comprises formic acid and/or oxalic acid.

P94. The method of any one of P85 to P93 wherein the acid solution is a first acid solution, the method comprising dissolving at least the portion of the surface of the metal component with the first acid solution at approximately room temperature and subsequently dissolving at least the portion of the surface of the metal component with a second acid solution at a temperature of at least approximately 80° F.

P95. The method of P94 wherein the temperature of the second acid solution is no more than approximately 250° F.

P96. The method of any one of P85 to P95 comprising dissolving at least the portion of the surface of the metal component with the acid solution at a temperature of no more than approximately 250° F.

P97. The method of any one of P85 to P96 comprising adding an oxidizing agent to the acid solution.

P98. The method of P97 wherein the oxidizing agent comprises hydrogen peroxide, permanganic acid, and/or a permanganate salt.

P99. The method of any one of P85 to P98 wherein separating the radionuclides from the waste solution comprises passing the waste solution through ion exchange media and/or a carbon bed.

P100. The method of P99 wherein the ion exchange media comprises ion-selective media configured to capture Co-60, Sr-90, Ni-63, and/or Cs-137.

P101. The method of any one of P85 to P100 wherein separating the radionuclides from the waste solution comprises precipitating the radionuclides from the waste solution.

P102. The method of P101 wherein precipitating the radionuclides comprises precipitating metal oxalates including the radionuclides.

P103. The method of P102 comprising calcining the metal oxalates including the radionuclides.

P104. The method of any one of P101 to P103 wherein precipitating the radionuclides comprises combining the waste solution with an aluminum-containing solution and inducing coprecipitation of aluminum flocs including the radionuclides.

P105. The method of P104 comprising adding calcium hydroxide to precipitate residual metals as hydroxides after the coprecipitation of the aluminum flocs.

P106. The method of any one of P101 to P105 comprising encapsulating precipitated solids including the radionuclides in cement.

P107. The method of any one of P85 to P106 wherein the metal component comprises a high nickel alloy, the method comprising immersing the metal component in an acid bath and applying an electric current to the metal component to induce electrodissolution after dissolving at least the portion of the surface with the acid solution.

P108. The method of any one of P85 to P107 wherein the metal component comprises a carbon steel component, the method comprising grit blasting the carbon steel component after dissolving at least the portion of the surface with the acid solution.

P109. The method of any one of P85 to P108 wherein the metal component is part of a steam generator.

P110. The method of P109 wherein the steam generator includes a primary side and a secondary side, and wherein the primary side includes the metal component.

P111. The method of P110 wherein the acid solution is a first acid solution, the method comprising dissolving at least the portion of the surface of the metal component with the first acid solution and subsequently dissolving at least another portion of the surface of the metal component with a second acid solution.

P112. The method of P111 wherein the first acid solution includes an organic acid and the second acid solution includes a mineral acid.

P113. The method of P112 wherein the organic acid comprises formic acid and the mineral acid comprises tetrafluoroboric acid.

P114. The method of any one of P110 to P113 wherein the acid solution is a first acid solution and the waste solution is a first waste solution, the method comprising dissolving at least a portion of a surface of a metal component that is part of the secondary side with a second acid solution to produce a second waste solution including radionuclides.

P115. The method of P114 wherein the second acid solution comprises oxalic acid.

P116. The method of any one of P114 to P115 comprising combining the first waste solution and the second waste solution to form a combined waste solution.

P117. The method of P116 comprising precipitating metal oxalates including radionuclides from the combined waste solution.

P118. A method of processing a metal component from the nuclear industry comprising: immersing at least a portion of the metal component in an electrolyte bath, the portion of the metal component including a target radionuclide; applying an electric current to the metal component to cause electrodissolution of at least the portion of the metal component in a solution; electroplating the target radionuclide from the solution onto a cathode.

P119. The method of P118 wherein the metal component is from a reactor vessel and/or an activated internal component of the reactor vessel.

P120. The method of any one of P118 to P119 wherein the portion of the metal component is a bulk-activated region of the metal component.

P121. The method of any one of P118 to P120 wherein the target radionuclide is a neutron activation product.

P122. The method of any one of P118 to P121 wherein the target radionuclide comprises Cobalt-60 and/or Nickel-63.

P123. The method of any one of P118 to P122 wherein electroplating the target radionuclide comprises selectively electroplating the target radionuclide relative to other dissolved metals from the metal component.

P124. The method of any one of P118 to P123 wherein the cathode is part of the metal component.

P125. The method of any one of P118 to P123 wherein the cathode is separate from the metal component.

P126. The method of any one of P118 to P125 comprising recovering the target radionuclide from the cathode.

P127. The method of P126 comprising preparing the target radionuclide recovered from the cathode for beneficial reuse.

P128. The method of any one of P118 to P127 comprising precipitating remaining dissolved metals and/or residual radionuclides from the solution after electroplating the target radionuclide.

P129. The method of P128 comprising removing precipitated solids by filtration, centrifugation, gravity settling/sedimentation, and the like.

P130. A method of processing components from the nuclear industry comprising: dissolving a metal composite component to produce a solution including dissolved metal from the metal composite component and particulate material from the metal composite component; and separating the particulate material from the solution.

P131. The method of P130 comprising media blasting a surface of another component from the nuclear industry with the particulate material separated from the solution.

P132. The method of P131 wherein the another component is a spent fuel transport cask.

P133. The method of P132 wherein the surface is an inner surface of the spent fuel transport cask.

P134. The method of P133 wherein the media blasting removes an activated layer from the inner surface.

P135. The method of P134 comprising collecting waste material removed by the media blasting, the waste material comprising activated metal particles and used particulate material.

P136. The method of P135 comprising packaging the waste material from the media blasting for disposal as radioactive waste.

P137. The method of any one of P130 to P136 wherein the metal component is dissolved with an acid.

P138. The method of P137 wherein the acid comprises hydrochloric acid (HCl) and/or nitric acid ($HNO_3$).

P139. The method of any one of P130 to P138 wherein the metal composite component comprises boron carbide impregnated aluminum.

P140. The method of any one of P130 to P139 wherein the particulate material comprises boron carbide.

P141. The method of any one of P130 to P140 wherein the metal composite component is part of a spent fuel rack.

General Terminology and Interpretative Conventions

Articles such as "the," "a," and "an" shall be interpreted as connoting the singular or plural. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group shall be interpreted to include one item alone, all the items together, or any combination or number of the items.

The phrase "based on" shall be interpreted to refer to an open set of conditions unless unequivocally stated otherwise (e.g., based on only a given condition). For example, a step described as being based on a given condition can be based on the recited condition and one or more unrecited conditions.

The term "can," when used as an auxiliary verb, shall refer to an optional or noncompulsory capability of the described subject matter that is not required to be present in any given embodiment.

The terms have, having, contain, containing, include, including, and characterized by shall be interpreted to be synonymous with the terms comprise and comprising—i.e., the terms are inclusive or open-ended and do not exclude additional unrecited subject matter. The use of these terms shall also be understood as disclosing and providing support for narrower alternative embodiments where these terms are replaced by "consisting of," "consisting of the recited subject matter plus impurities and/or trace amounts of other materials," or "consisting essentially of."

Certain features described in the context of separate embodiments can also be implemented in combination in a single embodiment. Conversely, various features described in the context of a single embodiment can also be implemented in multiple embodiments separately or in any suitable subcombination. Moreover, although features may be described in certain combinations and even initially claimed as such, one or more features from a claimed combination can be excised from the combination, and the claimed combination may be directed to a subcombination or variation of a subcombination.

Many aspects or features are described as being optional, e.g. through the use of the term "can" or otherwise. For the sake of brevity and legibility, this document does not explicitly recite each combination and/or permutation that may be obtained by choosing from the set of optional aspects or features. However, this document is to be interpreted as explicitly disclosing all such combinations and/or permutations. For example, something described as having three optional aspects may be embodied in seven different ways, namely with only one of the three aspects, with any two of the three aspects, or with all three of the aspects.

Any methods described in this document should not be interpreted to require the steps to be performed in a specific order unless expressly stated otherwise or doing so is literally impossible. The methods should also be interpreted to provide support to perform the recited steps in any sequence unless expressly stated otherwise.

The example configurations described in this document do not represent all the examples that may be implemented or that are within the scope of the claims. The term "example" shall be interpreted to mean "serving as an example, instance, or illustration," and not "preferred" or "advantageous over other examples."

Unless otherwise indicated, all numbers or expressions, such as those expressing dimensions, physical characteristics, or the like, used in the specification (other than the claims) are understood to be modified in all instances by the term "approximately." At the very least, and not as an attempt to limit the application of the doctrine of equivalents to the claims, each numerical parameter recited in the specification or claims which is modified by the term "approximately" should be construed in light of the number of recited significant digits and/or by applying ordinary rounding techniques.

All disclosed ranges are to be understood to encompass and provide support for claims that recite any subranges or any individual values subsumed by each range. For example, a stated range of 1 to 10 should be considered to include and provide support for claims that recite any subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth), which values can be expressed alone or as a minimum value (e.g., at least 5.8) or a maximum value (e.g., no more than 9.9994).

All disclosed numerical values are to be understood as being variable from 0-100% in either direction and thus provide support for claims that recite such values (either alone or as a minimum or a maximum—e.g., at least <value> or no more than <value>) or any ranges or subranges that can be formed by such values. For example, a stated numerical value of 8 should be understood to vary from 0 to 16 (100% in either direction) and provide support for claims that recite the range itself (e.g., 0 to 16), any subrange within the range (e.g., 2 to 12.5) or any individual value within that range expressed individually (e.g., 15.2), as a minimum value (e.g., at least 4.3), or as a maximum value (e.g., no more than 12.4).

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used in this document shall mean" or similar language (e.g., "this term means," "this term is defined as," "for the purposes of this disclosure this term shall mean," etc.). References to specific examples, use of "i.e.," use of the word "invention," etc., are not meant to invoke exception (b) or otherwise restrict the scope of the recited claim terms. Other than situations where exception (b) applies, nothing contained in this document should be considered a disclaimer or disavowal of claim scope.

None of the limitations in the claims shall be interpreted as invoking 35 U.S.C. 112(f) unless the words "means for" or "step for" are explicitly recited in the claim.

Unless explicitly stated otherwise or otherwise apparent from context, terms such as "processing," "computing," "calculating," "determining," "displaying," or the like, refer to the action and processes of an electronic computing device including a processor and memory.

The subject matter recited in the claims is not coextensive with and should not be interpreted as coextensive with any embodiment, feature, or combination of features described or illustrated in this document. This is true even if only a single embodiment of the feature or combination of features is illustrated and described.

Drawing Related Terminology and Interpretative Conventions

Reference numbers in the drawings and corresponding description refer to identical or similar elements although such numbers may be referenced in the context of different embodiments.

The drawings are intended to illustrate embodiments that are both drawn to scale and/or not drawn to scale. This means the drawings can be interpreted, for example, as showing: (a) everything drawn to scale, (b) nothing drawn to scale, or (c) one or more features drawn to scale and one or more features not drawn to scale. Accordingly, the drawings can serve to provide support to recite the sizes, proportions, and/or other dimensions of any of the illustrated features either alone or relative to each other. Furthermore, all such sizes, proportions, and/or other dimensions are to be understood as being variable from 0-100% in either direction and thus provide support for claims that recite such values or any ranges or subranges that can be formed by such values.

Spatial or directional terms, such as "left," "right," "front," "back," or the like, relate to the subject matter as it is shown in the drawings and/or how it is commonly oriented during manufacture, use, or the like. However, it is to be understood that the described subject matter may assume various alternative orientations and, accordingly, such terms are not to be considered as limiting.

Composition Related Terminology and Interpretative Conventions

Values expressed as a percentage, parts of, or a ratio are by weight unless expressly stated otherwise.

The description of a group or class of materials as suitable or preferred for a given purpose shall be understood as disclosing that a single member of the group or class or a mixture of any two or more members of the group or class are equally suitable or preferred.

The description of constituents in chemical terms refers to the constituents: (a) at the time of addition to any combination specified in the description (e.g., the formal or analytical concentration of a salt that dissociates in solution) and/or (b) generated in situ by chemical reactions with other constituents. The description of the constituents does not preclude other chemical interactions among the constituents of a mixture once mixed unless expressly stated otherwise.

The description of materials in ionic form additionally implies the presence of sufficient counter ions to produce electrical neutrality for the composition.

INCORPORATION BY REFERENCE

The entire content of each document listed below is incorporated by reference into this document (the documents below are collectively referred to as the "incorporated documents"). If the same term is used in both this document and one or more of the incorporated documents, then it should be interpreted to have the broadest meaning imparted by any one or combination of these sources unless the term has been explicitly defined to have a different meaning in this document. If there is an inconsistency between any incorporated document and this document, then this document shall govern. The incorporated subject matter should not be used to limit or narrow the scope of the explicitly recited or depicted subject matter.

Benefit/priority patent documents incorporated by reference:

Int'l Pat. App. No. PCT/US2024/042807, titled "Methods for Recycling Metals from the Nuclear Industry," filed on 16 Aug. 2024.

U.S. Prov. App. No. 63/519,951, titled "Methods for Recycling Metals from the Nuclear Industry," filed on 16 Aug. 2023.

Additional documents incorporated by reference:

Int'l Pat. App. No. PCT/US2024/042804, titled "Methods for Extracting Radioisotopes from Radiologically Contaminated Waste," filed on 16 Aug. 2024.

U.S. patent application Ser. No. 19/058,667, titled "Methods for Extracting Radioisotopes from Radiologically Contaminated Waste," filed on 20 Feb. 2025.

What is claimed is:

1. A method of processing a metal component from the nuclear industry having a surface contaminated with radionuclides, the method comprising:

dissolving at least a portion of the surface of the metal component with an acid solution to produce a contaminated solution including the radionuclides; and selectively separating individual radionuclides from the radionuclides in the contaminated solution.

2. The method of claim 1 wherein the metal component comprises metal tubing and the dissolving comprises circulating the acid solution through an interior of the metal tubing.

3. The method of claim 1 comprising dissolving at least the portion of the surface of the metal component with a series of at least two different acid solutions.

4. The method of claim 1 wherein the acid solution comprises a mineral acid.

5. The method of claim 1 wherein the acid solution comprises an organic acid.

6. The method of claim 1 wherein selectively separating the individual radionuclides from the contaminated solution comprises separating the individual radionuclides via ion exchange media, selective precipitation, solvent extraction, and/or a carbon bed.

7. The method of claim 1 wherein the metal component is part of a steam generator.

8. The method of claim 1 wherein the acid solution comprises a mineral acid and an oxidizing agent.

9. The method of claim 8 wherein the mineral acid is hydrochloric acid.

10. The method of claim 8 wherein the oxidizing agent comprises hydrogen peroxide, permanganic acid, and/or a permanganate salt.

11. The method of claim 10 wherein the oxidizing agent is hydrogen peroxide.

12. A method of processing a metal component from the nuclear industry comprising:

immersing at least a portion of the metal component in an electrolyte bath, the portion of the metal component comprising radionuclides including a target radionuclide;

applying an electric current to the metal component to cause electrodissolution of the portion of the metal component in a solution, the solution including dissolved radionuclides from the radionuclides from the metal component; and selectively electroplating the target radionuclide from the solution onto a cathode separately from other dissolved radionuclides from the metal component.

13. The method of claim 12 wherein the metal component is from a reactor vessel and/or an activated internal component of the reactor vessel.

14. The method of claim 12 wherein the portion of the metal component is a bulk-activated region of the metal component.

15. The method of claim 12 wherein the target radionuclide is a neutron activation product.

16. The method of claim 12 wherein the target radionuclide comprises Cobalt-60 and/or Nickel-63.

17. The method of claim 12 comprising recovering the target radionuclide from the cathode.

* * * * *